(12) United States Patent
Vinn

(10) Patent No.: US 7,495,420 B2
(45) Date of Patent: Feb. 24, 2009

(54) LDO WITH SLAVED SWITCHING REGULATOR USING FEEDBACK FOR MAINTAINING THE LDO TRANSISTOR AT A PREDETERMINED CONDUCTION LEVEL

(75) Inventor: Charles Vinn, Milpitas, CA (US)

(73) Assignee: Micrel, Inc., San Jose, CA (US)

( * ) Notice: Subject to any disclaimer, the term of this patent is extended or adjusted under 35 U.S.C. 154(b) by 131 days.

(21) Appl. No.: 11/327,798

(22) Filed: Jan. 5, 2006

(65) Prior Publication Data

US 2007/0152644 A1    Jul. 5, 2007

(51) Int. Cl.
    *G05F 1/00*    (2006.01)
(52) U.S. Cl. .................. 323/266; 323/268; 323/282
(58) Field of Classification Search ............ 323/266, 323/268, 273, 282, 304
    See application file for complete search history.

(56) References Cited

U.S. PATENT DOCUMENTS

| 4,459,537 | A | * | 7/1984 | McWhorter | 323/224 |
| 4,679,130 | A | * | 7/1987 | Moscovici | 363/17 |
| 4,755,741 | A |   | 7/1988 | Nelson    |         |
| 6,441,591 | B2| * | 8/2002 | Nokkonen  | 323/266 |
| 6,469,478 | B1| * | 10/2002| Curtin    | 323/266 |
| 6,502,145 | B1| * | 12/2002| Ooishi    | 710/22  |
| 2003/0201816 | A1 | * | 10/2003 | Dotson | 327/361 |
| 2004/0178776 | A1 | * | 9/2004  | Hansen et al. | 323/266 |

* cited by examiner

Primary Examiner—Akm E Ullah
Assistant Examiner—Arun Williams
(74) Attorney, Agent, or Firm—Patent Law Group LLP; Brian D. Ogonowsky

(57) ABSTRACT

A voltage regulator is disclosed having a switching regulator portion and an LDO regulator portion on a single chip. The switching portion switches one or more transistors at a high frequency to supply a voltage to a terminal of a series transistor of an LDO regulator. A second terminal of the series transistor provides the output voltage of the LDO regulator. The LDO regulator controls the conductivity of the series transistor to regulate the LDO regulator output voltage to be a desired fixed value. To minimize power dissipation in the series transistor, a feedback signal is taken from the series transistor indicating the level of saturation of the series transistor. This feedback signal is used by the switching regulator to adjust the switching regulator's output voltage such that the voltage supplied to the series transistor is close to the output voltage of the LDO. If there is a change of current, temperature, or process variations, the switching regulator voltage will be adjusted accordingly to keep the series transistor at a desired level in saturation. By minimizing the voltage drop across the series transistor and operating the series transistor at an optimum level of saturation, the overall regulator is highly efficient.

18 Claims, 3 Drawing Sheets

LDO WITH SLAVED SWITCHING REGULATOR USING FEEDBACK FOR MAINTAINING THE LDO TRANSISTOR AT A PREDETERMINED CONDUCTION LEVEL

FIELD OF THE INVENTION

This invention relates to voltage regulators and, in particular, to voltage regulators using a switching regulator to supply voltage to the series transistor of a linear (or low dropout) regulator.

BACKGROUND

A linear regulator, also referred to as a low dropout (LDO) regulator, controls the conductance of a bipolar or MOS transistor in series between a supply voltage and the output terminal of the regulator. The conductance of the transistor is controlled based upon the difference between a feedback voltage (corresponding to the output voltage) and a reference voltage to keep the output voltage at the desired level. An LDO regulator provides a very smooth output by constantly adjusting the conductivity of the series transistor.

In contrast to an LDO regulator, a switching regulator, such as a pulse width modulation (PWM) regulator, switches a transistor on and off at a variable duty cycle so the output voltage, even though filtered, has some undesired ripple. Switching regulators are generally more efficient than LDO regulators at medium to high currents since the switching transistor operates in or near saturation and energy is transferred efficiently from the supply voltage to the output through a reactive element, such as an inductor.

LDO regulators are most efficient when the supply voltage applied to the series transistor is only slightly greater than the output voltage so as to minimize the voltage drop across the series transistor. To maximize efficiency, the series transistor should operate at the edge of saturation, such as just outside of saturation, to minimize power dissipation in the transistor while simultaneously compensating for variations in the supply voltage.

One approach that has been used in the past is to provide an efficient switching regulator, such as a pulse width modulation (PWM) regulator, that generates a supply voltage for the LDO's series transistor that is only slightly above the desired output voltage of the LDO. However, since the dropout voltage of the series transistor varies with current, process variations, temperature, and other factors, the supply voltage must be set to be at or above that voltage needed for the worst case scenario. Therefore, the supply voltage is typically higher than what is needed under normal conditions, reducing the efficiency of the LDO regulator.

What is needed is a more efficient voltage regulator using a switching regulator to supply voltage to the LDO series transistor.

SUMMARY

An extremely efficient regulator is disclosed having a switching regulator portion and an LDO regulator portion on a single chip. The switching regulator portion switches one or more transistors at a particular duty cycle to supply a voltage to the collector of a series bipolar transistor in the LDO regulator portion.

The switching regulator compares a feedback voltage, corresponding to a saturation level of the LDO series transistor, to a reference voltage. The switcher adjusts its switching duty cycle to keep the feedback voltage matched to the reference voltage. The reference voltage may be set to achieve any level of saturation of the series transistor, such as slightly in saturation or deep into saturation.

The collector voltage provided by the switching regulator to the series transistor is controlled using feedback from the LDO regulator to be slightly greater that the desired LDO output voltage so the LDO transistor remains at a certain conduction level.

A first emitter of the series transistor provides the "high current" regulated output voltage for the chip. A second emitter, much smaller than the first emitter, provides the "low current" feedback signal. When the transistor begins to saturate, which is the most efficient state of operation, the second emitter operates in the reverse mode (effectively becoming a collector) to draw current rather than to supply current. The magnitude of this reverse current signal is sensed and is used to raise or lower the feedback voltage for the switching regulator, which raises or lowers the switching regulator's output voltage, to maintain the series transistor at a certain level in saturation. The switching regulator output voltage will be automatically adjusted to be slightly higher than the output voltage of the LDO regulator in order to keep the series transistor at a particular level of saturation despite changes in current, process variations, and temperature.

The characteristics of the second emitter may be adjusted such that the transistor's saturation level with respect to the second emitter corresponds to a desired conductance level of the transistor between the collector terminal and the first emitter (the LDO output terminal).

Many types of switching regulators and linear regulators can be used.

DETAILED DESCRIPTION

Figure 1:
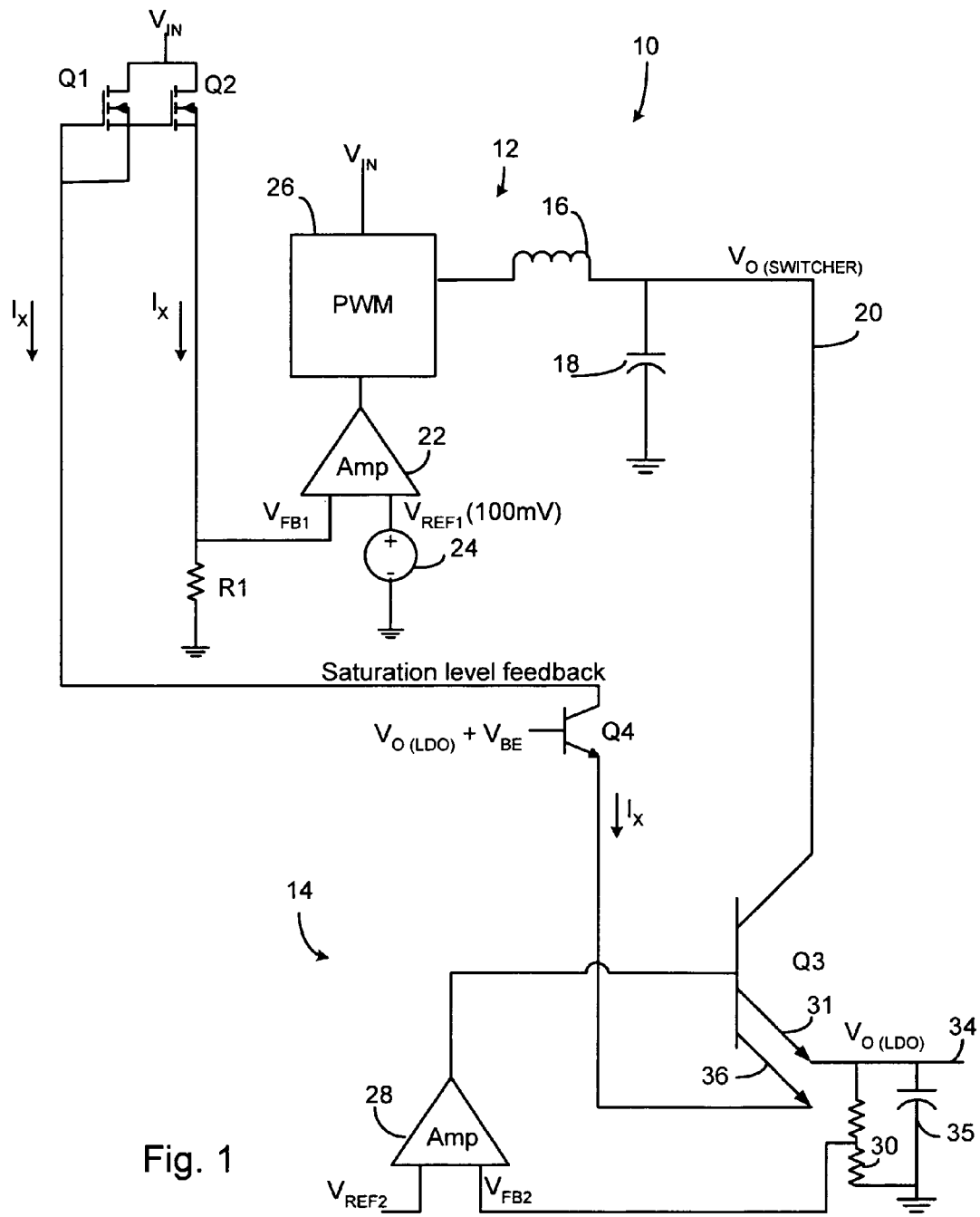
FIG. 1 is a diagram illustrating one embodiment of the invention.

FIG. 1 illustrates a voltage converter 10 including a PWM regulator 12 and a linear regulator 14, also referred to as a low dropout (LDO) regulator 14.

The PWM regulator 12 controls one or more bipolar or MOS transistors to be on and off to intermittently couple the power supply voltage $V_{IN}$ to the input of an inductor 16. The power supply may be a battery. A capacitor 18 smoothes the triangular inductor current to provide a DC voltage $V_{O\ (SWITCHER)}$ at the output node 20. The amount of time that the transistor couples the power supply to the inductor 16 versus the total time is called the duty cycle and determines the voltage $V_{O\ (SWITCHER)}$ at node 20.

Although the embodiment described uses a step down switching regulator, the switching regulator may be a step up, inverting, or any other type of switching regulator.

A differential amplifier 22 (also known as an error amplifier) receives a feedback voltage $V_{FB1}$ and receives a reference voltage $V_{REF1}$ generated by voltage source 24. A PWM circuit 26 adjusts the duty cycle of the one or more switching transistors (internal to block 26) to cause the feedback voltage to match the reference voltage. A logic/driver circuit in PWM circuit 26 supplies the control signals to the one or more switching transistors.

The LDO regulator 14 has an error amplifier 28 that receives a feedback voltage $V_{FB2}$ from a resistor divider 30 and receives a reference voltage $V_{REF2}$. The error amplifier 28 outputs an error voltage for controlling the conductance of bipolar transistor Q3 by adjusting the base current in order to match the feedback voltage to the reference voltage.

The amplifiers 22 and 28 will typically have a capacitor coupled to ground to filter the outputs of the error amplifiers.

The collector of transistor Q3 is coupled to $V_{O\ (SWITCHER)}$. One emitter 31 of transistor Q3 provides the output voltage $V_{O(LDO)}$ of the LDO regulator at node 34. The output voltage may be additionally smoothed by a capacitor 35. Increasing the error voltage ($V_{FB2}$ too low) increases the base current to increase the transistor's conductance to raise $V_{O(LDO)}$. Decreasing the error voltage ($V_{FB2}$ too high) decreases the base current to decrease the transistor's conductance to lower $V_{O(LDO)}$.

A second emitter 36 of transistor Q3 provides a feedback path to the PWM regulator 12. The second emitter 36 is much smaller than (e.g., less than ⅒) the emitter 31 so as to conduct a relatively small current.

Transistor Q4 is connected in a cascode configuration in the emitter 36 feedback path and provides isolation as well as limits the voltage at the emitter 36 to avoid breakdown. The base of transistor Q4 is tied to a voltage of approximately $V_{O(LDO)}+V_{BE}$ so that transistor Q4 is biased on to conduct the current $I_X$. The voltage of approximately $V_{O(LDO)}+V_{BE}$ may be generated by connecting a diode between $V_{O(LDO)}$ and a current source. A different biasing voltage would also be acceptable.

When the collector voltage $V_C$ of transistor Q3 falls to a low enough value (e.g., less than about 0.2 volts above the emitter 31 voltage $V_{O(LDO)}$), transistor Q3 will start to saturate. In such a case, the base-collector junction will become forward biased.

Emitters 31 and 36 are N+ regions formed in a P base region, assuming the series transistor is an NPN transistor, where a large N− collector region surrounds the base region. The N− collector, which is relatively resistive, typically has an N+ collector contact area for connection to the collector lead. The small emitter 36 is located in the base region at a position relatively distant from the emitter 31 and the N+ collector contact, so that the collector voltage near emitter 36 is lower than the collector voltage near emitter 31, since emitter 31 is closer to the N+ collector contact. In this way, the base/collector junction near the small emitter 36 can be forward biased (i.e., base voltage is sufficiently greater than the collector voltage so as to start turning on the PN diode) while the base/collector junction near the larger emitter 31 can be reversed biased (e.g., on the outside edge of saturation), even though the emitters are at the same potential ($V_{O(LDO)}$). Since the base-collector junction near emitter 36 is forward biased during the onset of saturation, the transistor Q3 will be in a reverse conduction mode with respect to emitter 36. Emitter 36 will thus act as a collector and sink current through transistor Q4.

The conductance level of the transistor corresponding to where emitter 36 draws current due to the onset of saturation is primarily determined by the characteristics of emitters 31 and 36 and the characteristics of the collector region.

As transistor Q3 begins to saturate and emitter 36 is operating in a reverse mode, the current $I_X$ into emitter 36 will increase.

Transistors Q1 and Q2 are connected in a current mirror configuration and are connected to the input voltage $V_{IN}$. Since transistor Q1 is in series with the emitter 36, transistor Q1 conducts the same current as the emitter 36 (discounting the small base current of transistor Q4). Transistor Q2 will conduct the same current $I_X$ since it is a current mirror. The mirrored current $I_X$ flows through resistor R1, which is connected to ground. Resistor R1 may be connected to any suitable fixed voltage, and the value of R1 is then adjusted accordingly.

The voltage at resistor R1 serves as the feedback voltage $V_{FB1}$ for the error amplifier 22 of the PWM regulator 12. As the current $I_X$ is increase due to the increased saturation of transistor Q3, $V_{FB1}$ is increased due to the increased voltage drop across R1. Since the PWM regulator 12 varies its duty cycle to keep $V_{FB1}$ matched to $V_{REF1}$, the PWM regulator 12 will increase its duty cycle to raise $V_{O\ (SWITCHER)}$. This increases the transistor Q3 collector voltage to prevent transistor Q3 from going deeper into saturation. Conversely, if transistor Q3 were not sufficiently saturated, the PWM regulator 12 would lower $V_{O\ (SWITCHER)}$ to cause transistor Q3 to enter or become more saturated with respect to emitter 36. The feedback circuit thus controls the conductance of transistor Q3 to be a precise level.

$V_{REF1}$ and R1 are set to achieve the desired saturation level of transistor Q3. The required values can be determined empirically or by simulation since they are dependent on the actual components used in the circuit. For example, the values may be chosen such that the transistor is just in or just out of saturation with respect to the larger emitter 31.

By keeping transistor Q3 at a particular high conductivity, such as at the edge of saturation, the voltage $V_{O\ (SWITCHER)}$ is kept very close to $V_{O(LDO)}$, such as within 0.2 volts depending on the load current, to minimize the voltage drop across transistor Q3 and, as a result, minimize the power dissipation in transistor Q3. Of course, the components may be selected for less than optimal performance if appropriate for a certain application.

Figure 2:
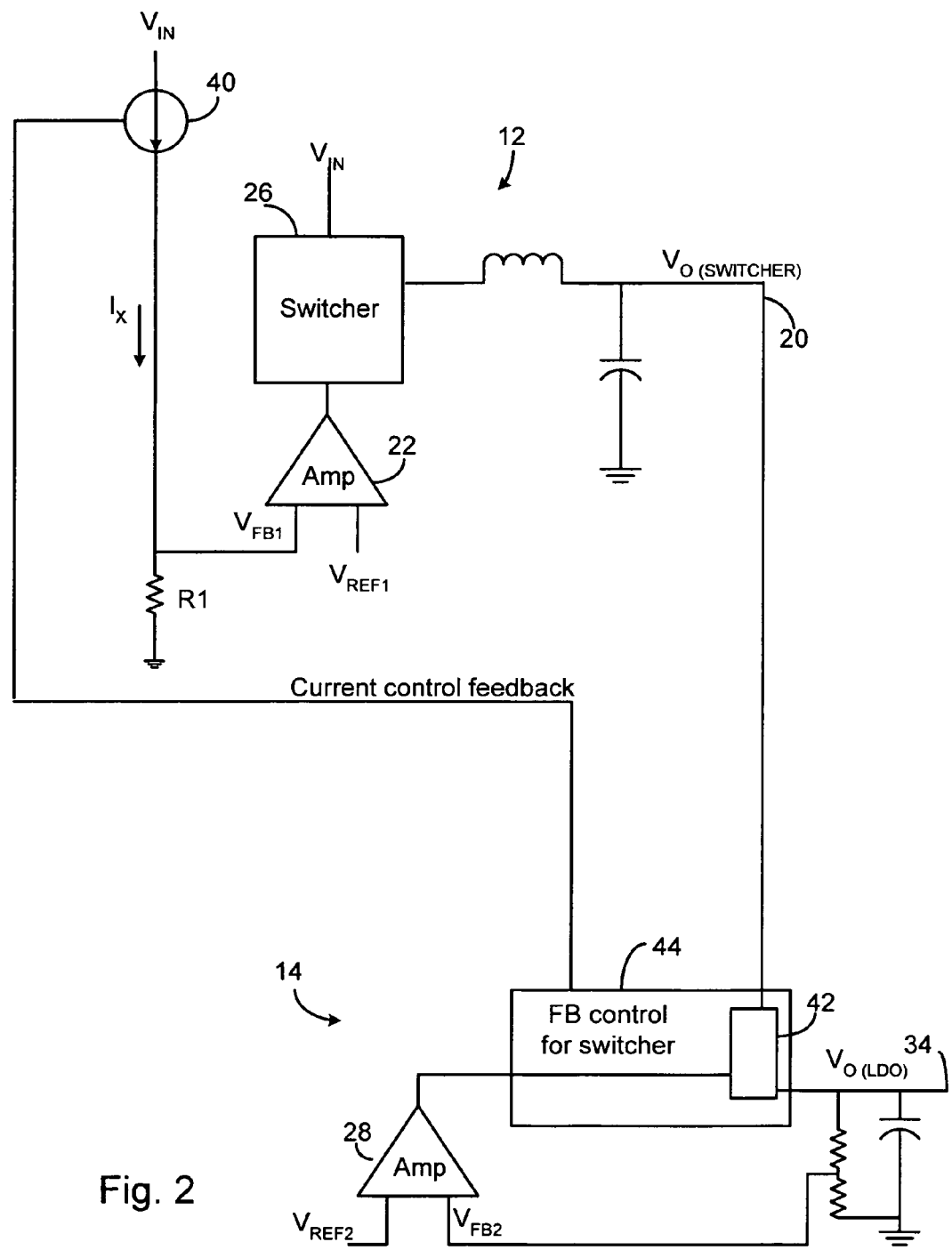
FIG. 2 is a diagram illustrating a more generic embodiment of the invention.

FIG. 2 illustrates a more generic circuit for carrying out the invention. The switching regulator 12 may be any type of regulator, such as a PWM, PFM, one-shot, resonant, or other type of regulator. A switching regulator is efficient since its switching transistor(s) are either fully on (in or close to saturation) or fully off. The feedback current through resistor R1 can be created using any variable current source 40 controlled by the conductivity level of the series transistor 42. The conductivity level of the series transistor 42 may be detected by other than a second emitter, such as by using a second transistor in parallel with the series transistor 42. The series transistor 42 may even be a MOSFET, where the conduction level of the MOSFET is detected by the current conducted by a parallel, smaller MOSFET.

The current control feedback generator has been labeled as FB Control for Switcher 44 in FIG. 2 to illustrate that many embodiments may be used to accomplish the function of varying the reference voltage to the switching regulator 12 to cause the regulator 12 to output a supply voltage to the series transistor to keep the series transistor at a certain level of conductance in order to achieve a very low voltage drop across the series transistor.

Figure 3:
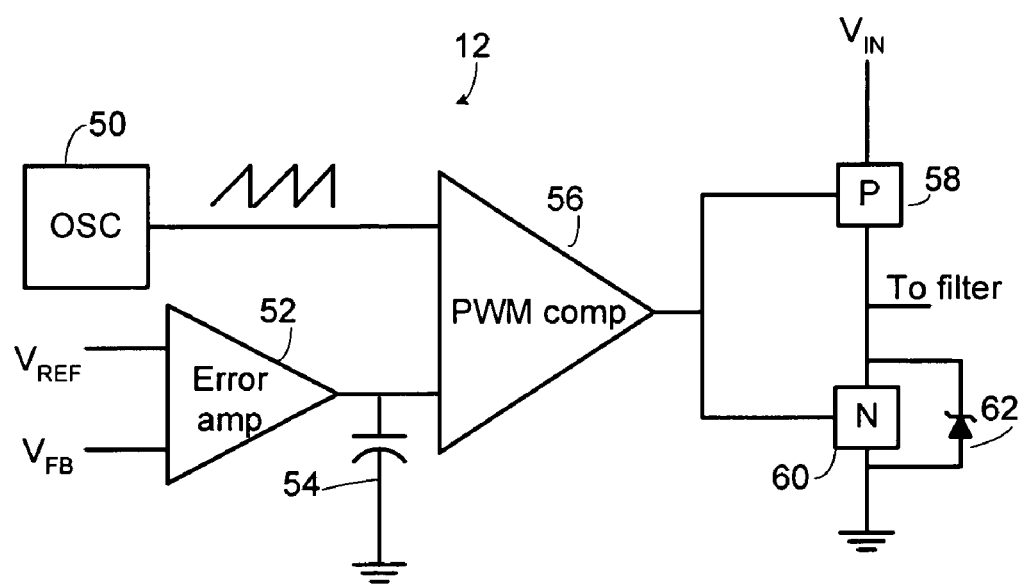
FIG. 3 illustrates details of a particular type of switching regulator that can be used in the embodiments of FIGS. 1 and 2.

FIG. 3 illustrates in more detail a typical PWM regulator 12 that may be used in the embodiment of FIG. 1. An oscillator 50 generates a sawtooth pattern at a high frequency (e.g., >100 KHz). The error amplifier 52 in conjunction with capacitor 54 generates a voltage that corresponds to the required duty cycle to keep the feedback voltage $V_{FB}$ matched to $V_{REF}$. A comparator 56 turns the high-side transistor 58 on at the beginning of a switching cycle. When the increasing sawtooth voltage crosses the error voltage, the comparator 56 turns off the high-side transistor 58 and turns on the synchronous rectifier 60. A diode 62 may be used instead of a synchronous rectifier. The transistor 58 and 60 may be bipolar or MOS transistors. In one embodiment, the high side transistor is a PNP or PMOS transistor.

Having described the invention in detail, those skilled in the art will appreciate that, given the present disclosure, modifications may be made to the invention without departing from the spirit and inventive concepts described herein.

Therefore, it is not intended that the scope of the invention be limited to the specific embodiments illustrated and described.

What is claimed is:

1. A voltage converter comprising:
   a switching regulator portion having a differential amplifier with inputs including a first reference signal and a first feedback signal, the switching regulator varying a duty cycle to substantially match the first feedback signal to the first reference signal, the switching regulator generating a first output voltage;
   a linear regulator portion controlling a series transistor to achieve a regulated second output voltage, a first terminal of the series transistor being coupled to the first output voltage of the switching regulator, a second terminal of the series transistor providing the regulated second output voltage; and
   a feedback circuit generating the first feedback signal signifying a conductance level of the series transistor, the first feedback signal being applied to the switching regulator to raise or lower the first output voltage of the switching regulator to achieve a particular differential voltage across the series transistor such that the conductance of the series transistor is maintained in steady state at a predetermined conductance level irrespective of a level of the regulated second output voltage wherein the series transistor is a bipolar transistor, the feedback circuit maintaining the bipolar transistor at a certain level in saturation.

2. The converter of claim 1 wherein the second terminal of the series transistor is a first emitter of the bipolar transistor.

3. The converter of claim 2 wherein the bipolar transistor includes a second emitter, the first feedback signal being based on a current signal generated when the bipolar transistor is operating in a reverse mode with respect to the second emitter, causing the second emitter to draw current when the transistor is in saturation with respect to the second emitter.

4. The converter of claim 1 wherein the switching regulator is a PWM regulator.

5. The converter of claim 1 wherein the linear regulator comprises an error amplifier, the error amplifier receiving a second reference signal and a second feedback signal for generating an error signal related to the difference between the second reference signal and the second feedback signal, the linear regulator controlling the conductivity of the series transistor to substantially match the second feedback signal to the second reference signal.

6. The converter of claim 1 wherein the feedback circuit comprises:
   a current mirror, a first leg of the current mirror generating a first current relating to a saturation level of the series transistor, a second leg of the current mirror generating a mirrored current corresponding to the first current; and
   a resistance connected in series with the mirrored current, a voltage at a first node of the resistance being used to generate the first feedback signal for the switching regulator to adjust the first output voltage of the switching regulator.

7. The converter of claim 6 wherein the feedback circuit further comprises a second transistor in series between a terminal of the series transistor and the first leg of the current mirror.

8. The converter of claim 6 further comprising a substantially constant voltage coupled to a second node of the resistance.

9. The converter of claim 8 wherein the substantially constant voltage is a common voltage of the voltage converter.

10. The converter of claim 1 wherein the switching regulator further comprises a filter circuit having an output terminal providing the first output voltage of the switching regulator.

11. The converter of claim 1 wherein the conductance level is slightly in saturation.

12. A method for voltage conversion comprising:
    varying a duty cycle of a switching voltage regulator to substantially match a first feedback signal to a first reference signal, the switching regulator generating a first output voltage;
    controlling a series transistor by a linear regulator to achieve a regulated second output voltage, a first terminal of the series transistor being coupled to the first output voltage of the switching regulator, a second terminal of the series transistor providing the regulated second output voltage; and
    generating the first feedback signal by a feedback circuit signifying a conductance level of the series transistor, the first feedback signal being applied to the switching regulator to raise or lower the first output voltage of the switching regulator to achieve a particular differential voltage across the series transistor such that the conductance of the series transistor is maintained in steady state at a predetermined conductance level irrespective of a level of the regulated second output voltage wherein the series transistor is a bipolar transistor, the feedback circuit maintaining the bipolar transistor at a certain level in saturation.

13. The method of claim 12 wherein the second terminal of the series transistor is a first emitter of the bipolar transistor.

14. The method of claim 13 wherein the bipolar transistor includes a second emitter, the first feedback signal being based on a current signal generated when the bipolar transistor is operating in a reverse mode with respect to the second emitter, causing the second emitter to draw current when the transistor is in saturation with respect to the second emitter.

15. The method of claim 12 wherein controlling the series transistor comprises an error amplifier in the linear regulator receiving a second reference signal and a second feedback signal for generating an error signal related to the difference between the second reference signal and the second feedback signal, the linear regulator controlling the conductivity of the series transistor to substantially match the second feedback signal to the second reference signal.

16. The method of claim 12 wherein generating the first feedback signal comprises:
    a first leg of a current mirror generating a first current relating to a saturation level of the series transistor, a second leg of the current mirror generating a mirrored current corresponding to the first current; and
    a resistance connected in series with the mirrored current creating a voltage at a first node of the resistance being used to generate the first feedback signal for the switching regulator to adjust the first output voltage of the switching regulator.

17. The method of claim 16 wherein generating the first feedback signal further comprises buffering the first current by a second transistor in series between a terminal of the series transistor and the first leg of the current mirror.

18. The method of claim 12 wherein the conductance level is slightly in saturation.

* * * * *